US010504435B2

(12) United States Patent
Jeon

(10) Patent No.: US 10,504,435 B2
(45) Date of Patent: Dec. 10, 2019

(54) PIXEL AND AN ORGANIC LIGHT-EMITTING DISPLAY APPARATUS

(71) Applicant: SAMSUNG DISPLAY CO., LTD., Yongin-si, Gyeonggi-Do (KR)

(72) Inventor: Jin Jeon, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 304 days.

(21) Appl. No.: 15/464,723

(22) Filed: Mar. 21, 2017

(65) Prior Publication Data

US 2017/0278459 A1 Sep. 28, 2017

(30) Foreign Application Priority Data

Mar. 22, 2016 (KR) ........................ 10-2016-0033993

(51) Int. Cl.
*G09G 3/3258* (2016.01)
*G09G 3/3233* (2016.01)
(Continued)

(52) U.S. Cl.
CPC ......... *G09G 3/3258* (2013.01); *G09G 3/3233* (2013.01); *G09G 3/3266* (2013.01); *G09G 3/3291* (2013.01); *G09G 2300/043* (2013.01); *G09G 2300/0809* (2013.01); *G09G 2300/0819* (2013.01); *G09G 2300/0842* (2013.01);
(Continued)

(58) Field of Classification Search
CPC .. G09G 3/3258; G09G 3/3233; G09G 3/3266; G09G 2300/043; G09G 2300/0809; G09G 2300/0819; G09G 2300/0842; G09G 2300/0866; G09G 2310/0245; G09G 2310/08; G09G 2330/028
See application file for complete search history.

(56) References Cited

U.S. PATENT DOCUMENTS 7,414,599 B2 8/2008 Chung et al.
2002/0195968 A1* 12/2002 Sanford ................ G09G 3/325
315/169.3
(Continued)

FOREIGN PATENT DOCUMENTS

KR 1020050005646 1/2005
KR 10-0698703 3/2007
(Continued)

*Primary Examiner* — Antonio Xavier
(74) *Attorney, Agent, or Firm* — F. Chau & Associates, LLC

(57) ABSTRACT

A pixel includes a storage capacitor connected between a first power line and a first node, a first transistor configured to control current flowing from a second node to a third node in response to a voltage of the first node, a second transistor configured to apply a data signal to the second node in response to a scan signal, a third transistor configured to connect the first node and the third node in response to the scan signal, a fourth transistor configured to connect the first power line and the second node in response to a control signal, and an organic light-emitting diode connected between the third node and a second power line. A level of a voltage applied to the second power line during an initialization period is greater than the level of the voltage applied to the second power line during an emission period.

19 Claims, 3 Drawing Sheets

(51) Int. Cl.
*G09G 3/3266* (2016.01)
*G09G 3/3291* (2016.01)

(52) U.S. Cl.
CPC ............... *G09G 2300/0866* (2013.01); *G09G 2310/0245* (2013.01); *G09G 2310/08* (2013.01); *G09G 2330/028* (2013.01)

(56) References Cited

U.S. PATENT DOCUMENTS

| | | | | |
|---|---|---|---|---|
| 2007/0229411 | A1 | 10/2007 | Choi | |
| 2008/0143653 | A1 | 6/2008 | Shishido | |
| 2011/0115835 | A1* | 5/2011 | Lee | G09G 3/3233 345/691 |
| 2011/0310077 | A1 | 12/2011 | Hwang et al. | |
| 2015/0054811 | A1* | 2/2015 | Azizi | G06F 1/3218 345/211 |
| 2015/0187270 | A1* | 7/2015 | Lee | G09G 3/3233 345/76 |
| 2015/0364083 | A1* | 12/2015 | Jeon | G09G 3/3233 345/76 |
| 2016/0189624 | A1* | 6/2016 | Jang | G09G 3/3258 345/213 |

FOREIGN PATENT DOCUMENTS

| | | |
|---|---|---|
| KR | 10-0805608 | 2/2008 |
| KR | 1020080056098 | 6/2008 |
| KR | 1020110054767 | 5/2011 |
| KR | 1020110138554 | 12/2011 |

* cited by examiner

PIXEL AND AN ORGANIC LIGHT-EMITTING DISPLAY APPARATUS

CROSS-REFERENCE TO RELATED APPLICATION

This application claims priority under 35 U.S.C. § 119 to Korean Patent Application No. 10-2016-0033993, filed on Mar. 22, 2016 in the Korean Intellectual Property Office, the disclosure of which is incorporated by reference herein in its entirety.

TECHNICAL FIELD

Exemplary embodiments of the inventive concept relate to a pixel and an organic light-emitting display apparatus.

DISCUSSION OF RELATED ART

An organic light-emitting display apparatus includes a light-emitting device, for example, an organic light-emitting diode, the luminance of which varies according to current. A pixel in the organic light-emitting display apparatus includes the organic light-emitting diode, a driving transistor that controls the amount of current supplied to the organic light-emitting diode according to a voltage between a gate terminal and a source terminal, and a switching transistor that applies a data voltage, for controlling a luminance of the organic light-emitting diode, to the driving transistor.

Driving transistors may have different threshold voltages due to manufacturing errors, and thus, even when the same data voltage is applied, the amounts of current output from the driving transistors may be different according to the different threshold voltages. Additionally, the amount of current to be output from a driving transistor during a current frame period may vary according to the amount of current output during a previous frame period. Furthermore, when an organic light-emitting diode emits light during a previous frame period, the organic light-emitting diode may slightly emit light during a current frame period even if a full black image is to be displayed.

As such, the pixel may further include a plurality of transistors in addition to the driving transistor and the switching transistor. Thus, additional control lines for controlling the additional transistors may be required. When transistors are added to the pixel, the area of the pixel is increased, which makes it difficult to increase resolution. However, when a distance between eyes of a user and a display apparatus is relatively small (e.g., in a head-mounted display apparatus), the resolution of the display apparatus has to be high to display a natural image.

SUMMARY

According to an exemplary embodiment of the inventive concept, a pixel is connected to a scan line that applies a scan signal, a data line that applies a data signal, a control line that applies a control signal, and first and second power lines. The pixel includes first through third nodes, a storage capacitor connected between the first power line and the first node, a first transistor configured to control current flowing from the second node to the third node in response to a voltage of the first node, a second transistor configured to apply the data signal to the second node in response to the scan signal, a third transistor configured to connect the first node to the third node in response to the scan signal, a fourth transistor configured to connect the first power line to the second node in response to the control signal, and an organic light-emitting diode connected between the third node and the second power line. One frame period includes an initialization period, a scan period, and an emission period. A level of a voltage applied to the second power line in the initialization period is higher than the level of the voltage applied to the second power line in the emission period.

The voltage applied to the second power line may have a first level during the initialization period, a second level during the scan period, and a third level during the emission period. The second level is lower than the first level, and the third level is lower than the second level.

A voltage applied to the first power line may have a fourth level during the initialization period and a fifth level, which is higher than the fourth level, during the emission period.

The voltage applied to the first power line may have the fifth level during the scan period.

A difference between the first level and the third level may be greater than a difference between the fifth level and the fourth level.

The second level may be substantially the same as the fifth level and the third level may be substantially the same as the fourth level.

The control signal, as a voltage having a sixth level, may be applied to the fourth transistor during the scan period to turn off the fourth transistor, and the control signal, as a voltage having a seventh level, may be applied to the fourth transistor during the emission period to turn on the fourth transistor.

The sixth level may be substantially the same as the first level.

The control signal, as the voltage having the seventh level, may be applied to the fourth transistor during the initialization period to turn on the fourth transistor.

According to an exemplary embodiment of the inventive concept, a pixel includes a storage capacitor, first through fourth transistors, and an organic light-emitting diode. The storage capacitor is connected between a first power line and a first node. The first transistor includes a gate terminal connected to the first node and is connected between second and third nodes. The second transistor includes a gate terminal connected to a scan line and is connected between a data line and the second node. The third transistor includes a gate terminal connected to the scan line and is connected between the first and third nodes. The fourth transistor includes a gate terminal connected to a control line and is connected between the first power line and the second node. The organic light-emitting diode is connected between the third node and a second power line. One frame period includes an initialization period, a scan period, and an emission period. A potential difference between the second power line and the first power line during the initialization period is greater than a potential difference between the first power line and the second power line during the emission period.

During the emission period, a first driving voltage may be applied to the first power line, and a second driving voltage, which is less than the first driving voltage, may be applied to the second power line, and during the initialization period, the second driving voltage may be applied to the first power line, and a gate-off voltage, which is greater than the first driving voltage, may be applied to the second power line.

During the scan period the first driving voltage may be applied to the first and second power lines.

A gate-off voltage may be applied to the control line during the scan period and a gate-on voltage may be applied to the control line during the initialization period and the emission period.

According to an exemplary embodiment of the inventive concept, an organic light-emitting display apparatus configured to be driven during a frame period including an initialization period, a scan period, and an emission period includes a display unit including pixels, a voltage generator, and a control driver. The voltage generator is configured to generate a first driving voltage, a second driving voltage that is less than the first driving voltage, a first gate voltage that is greater than the first driving voltage, and a second gate voltage that is less than the first gate voltage. The control driver is configured to drive first and second power lines and a control line connected to the pixels by using the first and second driving voltages and the first and second gate voltages. The control driver applies the first gate voltage to the second power line during the initialization period.

Each of the pixels may include a storage capacitor, first through fourth transistors, and an organic light-emitting diode. The storage capacitor is connected between the first power line and a first node. The first transistor includes a gate terminal connected to the first node and is connected between second and third nodes. The second transistor includes a gate terminal connected to a scan line and is connected between a data line and the second node. The third transistor includes a gate terminal connected to the scan line and is connected between the first and third nodes. The fourth transistor includes a gate terminal connected to the control line and is connected between the first power line and the second node. The organic light-emitting diode is connected between the third node and the second power line.

The control driver may apply the second driving voltage to the first power line during the initialization period.

The control driver may apply the first driving voltage to the first power line and the second power line during the scan period.

The control driver may apply the first driving voltage to the first power line and may apply the second driving voltage to the second power line during the emission period.

The control driver may apply the second gate voltage to the control line during the initialization period and the emission period, and may apply the first gate voltage to the control line during the scan period.

The pixels may sequentially receive data signals during the scan period, may substantially simultaneously emit light when the emission period starts, and may substantially simultaneously stop light emission when the initialization period starts.

BRIEF DESCRIPTION OF THE DRAWINGS

The above and other features of the inventive concept will become apparent and more readily appreciated by describing in detail exemplary embodiments thereof with reference to the accompanying drawings.

DETAILED DESCRIPTION OF THE EMBODIMENTS

Figure 1:
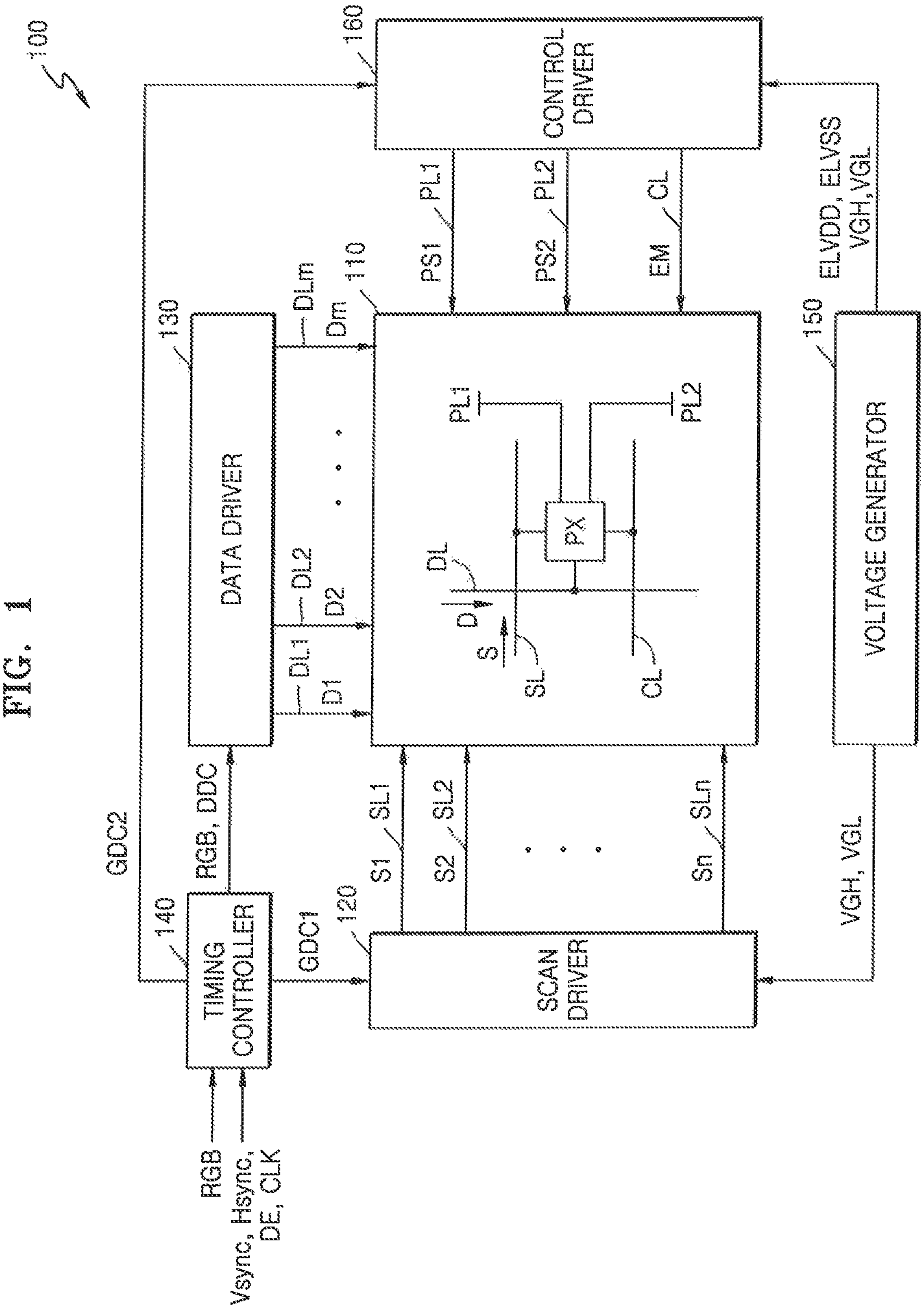
FIG. 1 is a block diagram of an organic light-emitting display apparatus according to an exemplary embodiment of the inventive concept.

Exemplary embodiments of the inventive concept will be described more fully hereinafter with reference to the accompanying drawings. Like reference numerals may refer to like elements throughout this application.

It will be understood that although the terms “first”, “second”, etc. may be used herein to describe various components, these components should not be limited by these terms. These components are only used to distinguish one component from another. As used herein, the singular forms “a”, “an”, and “the” are intended to include the plural forms as well, unless the context clearly indicates otherwise. Throughout the specification, it will be understood that when an element is referred to as being “connected” to another element, it may be “directly connected” to the other element or “electrically connected” to the other element with intervening elements therebetween. It will be further understood that when a part “includes” or “comprises” an element, unless otherwise defined, the part may further include other elements.

Exemplary embodiments of the inventive concept provide a pixel suitable for a display apparatus having a high resolution and an organic light-emitting display apparatus including the pixel.

FIG. 1 is a block diagram of an organic light-emitting display apparatus according to an exemplary embodiment of the inventive concept.

Referring to FIG. 1, an organic light-emitting display apparatus 100 includes a display unit 110, a scan driver 120, a data driver 130, a timing controller 140, a voltage generator 150, and a control driver 160.

The display unit 110 includes pixels PX. Although only one pixel PX is shown in FIG. 1 for illustrative purposes, the pixels PX may be arranged, for example, in a matrix.

The pixels PX are connected to scan lines SL1 through SLn and data lines DL1 through DLm. The scan lines SL1 through SLn apply scan signals S1 through Sn, respectively, that are output from the scan driver 120 to the pixels PX in the same row. The data lines DL1 through DLm apply data signals D1 through Dm, respectively, that are output from the data driver 130 to the pixels PX in the same column. Each of the pixels PX is connected to a scan line SL, among the scan lines SL1 through SLn, located in the same row and a data line DL, among the data lines DL1 through DLm, located in the same column.

The pixels PX are commonly connected to a control line CL and first and second power lines PL1 and PL2. The control line CL and the first and second power lines PL1 and PL2 are driven by the control driver 160.

The control line CL may include a plurality of sub-control lines connected to the pixels PX arranged in the matrix. The plurality of sub-control lines may extend in a row direction in parallel with the scan lines SL1 through SLn. Since the sub-control lines apply a control signal EM to the pixels PX with substantially the same timing whereas the scan lines SL1 through SLn apply scan signals of different timings, all of the sub-control lines are electrically connected. In this regard, the sub-control lines are referred to as one control line CL.

The first power line PL1 may include a plurality of sub-power lines connected to the pixels PX arranged in the matrix. The sub-power lines may extend in a column direction in parallel with the data lines DL1 through DLm. All of the sub-power lines are electrically connected and voltage levels of the sub-power lines change with substantially the same timing. In this regard, the sub-power lines are referred to as one first power line PL1. A voltage applied to the first power line PL1 may change during one frame period and is referred to as a first power voltage PS1.

The second power line PL2 may be commonly connected to organic light-emitting diodes of the pixels PX as a common electrode. A voltage applied to the second power line PL2 may change for one frame period and is referred to as a second power voltage PS2.

Each pixel PX includes an organic light-emitting diode and a driving transistor that controls the amount of current flowing through the organic light-emitting diode based on a voltage level of a data signal D that is received. The data signal D is applied from the data driver 130 through the data line DL. The organic light-emitting diode emits light at a luminance corresponding to a voltage level of the data signal D. The pixel PX may correspond to a part of a pixel, for example, a sub-pixel, which may display a full color image.

The pixel PX will be explained below in more detail with reference to FIGS. 2 and 3.

The voltage generator 150 may generate voltages needed to operate the scan driver 120 and the control driver 160. For example, the voltage generator 150 may generate a first driving voltage ELVDD and a second driving voltage ELVSS. The first driving voltage ELVDD is a voltage applied to the first power line PL1 and the second driving voltage ELVSS is a voltage applied to the second power line PL2. A level of the second driving voltage ELVSS may be lower than a level of the first driving voltage ELVDD.

Additionally, the voltage generator 150 may generate a first gate voltage VGH and a second gate voltage VGL for controlling a transistor of the pixel PX. When the first gate voltage VGH is applied to a gate of the transistor, the transistor may be turned off and when the second gate voltage VGL is applied to the gate of the transistor, the transistor may be turned on. In this regard, the first gate voltage VGH may be referred to as a gate-off voltage and the second gate voltage VGL may be referred to as a gate-on voltage. A level of the first gate voltage VGH may be higher than a level of the second gate voltage VGL.

Furthermore, a level of the first gate voltage VGH may be higher than a level of the first driving voltage ELVDD. A level of the second gate voltage VGL may be lower than a level of the second driving voltage ELVSS. For example, the first driving voltage ELVDD may be about 4.6 V and the second driving voltage ELVSS may be about −4 V. The first gate voltage VGH may be about 7 V and the second gate voltage VGL may be about −8 V. These are merely examples and the inventive concept is not limited thereto.

The voltage generator 150 may generate voltages having different levels in addition to the above-described four voltages and may apply these voltages to the control driver 160. Additionally, the voltage generator 150 may generate gamma reference voltages and may apply the gamma reference voltages to the data driver 130.

The timing controller 140 may control the display unit 110 by controlling operation timings of the scan driver 120, the data driver 130, and the control driver 160. The pixels PX of the display unit 110 may display an image corresponding to image data RGB of one frame by receiving the data signal D every frame period and emitting light at a luminance corresponding to the received data signal D.

According to an exemplary embodiment of the inventive concept, one frame period may include an initialization period, a scan period, and an emission period. During the initialization period, driving transistors of the pixels PX are initialized to remove their hysteresis characteristics. During the scan period, scan signals S1 through Sn are sequentially applied to the pixels PX of the display unit 110 and the data signals D1 through Dm are received in synchronization with the scan signals S1 through Sn. During the emission period, the pixels PX of the display unit 110 emit light. According to an exemplary embodiment of the inventive concept, all of the pixels PX in the display unit 110 may simultaneously emit light. According to an exemplary embodiment of the inventive concept, when the display unit 110 is divided into a plurality of areas, for example, an area for displaying a left-eye image and an area for displaying a right-eye image, the pixels PX in each of the plurality of areas may simultaneously emit light.

The timing controller 140 receives a vertical synchronization signal Vsync, a horizontal synchronization signal Hsync, a data enable signal DE, a clock signal CLK, and image data RGB from the outside (e.g., from a host). The timing controller 140 may control operation timings of the scan driver 120, the data driver 130, and the control driver 160 by using timing signals such as the vertical synchronization signal Vsync, the horizontal synchronization signal Hsync, the data enable signal DE, the clock signal CLK, and the image data RGB. The timing controller 140 may determine a frame period by counting the data enable signal DE of one horizontal scan period. In this case, the vertical synchronization signal Vsync and the horizontal synchronization signal Hsync applied may be omitted. The image data RGB includes luminance information of the pixels PX. A luminance has a predetermined number of gray values, for example, 1024 ($=2^{10}$), 256 ($=2^8$), or 64 ($=2^6$) gray values.

The timing controller 140 may generate control signals including a first gate timing control signal GDC1 for controlling an operation timing of the scan driver 120, a data timing control signal DDC for controlling an operation timing of the data driver 130, and a second gate timing control signal GDC2 for controlling an operation timing of the control driver 160.

The first gate timing control signal GDC1 may include a gate start pulse GSP, a gate shift clock GSC, and a gate output enable signal GOE. The gate start pulse GSP is applied to the scan driver 120 that generates a first scan signal at a starting point of the scan period. The gate shift clock GSC is a clock signal, commonly input to the scan driver 120, for shifting the gate start pulse GSP. The gate output enable signal GOE is used to control an output of the scan driver 120.

The data timing control signal DDC may include a source start pulse SSP, a source sampling clock SSC, and a source output enable signal SOE. The source start pulse SSP is used to control a data sampling starting point of the data driver 130 and is applied to the data driver 130 at the starting point of the scan period. The source sampling clock SSC is a clock signal for controlling a data sampling operation in the data driver 130 based on a rising or falling edge. The source output enable signal SOE is used to control an output of the data driver 130. The source start pulse SSP applied to the data driver 130 may be omitted in a data transmission method according to an exemplary embodiment of the inventive concept.

The second gate timing control signal GDC2 is applied to the control driver 160 to distinguish between the initialization period, the scan period, and the emission period in each frame period.

The scan driver 120 sequentially generates the scan signals S1 through Sn, in response to the first gate timing control signal GDC1 provided from the timing controller 140, by using the first and second gate voltages VGH and VGL provided from the voltage generator 150. The scan driver 120 applies the scan signals S1 through Sn to the pixels PX of the display unit 110 through the scan lines SL1 through SLn, respectively. The scan driver 120 may apply the first gate voltage VGH to the scan lines S1 through Sn during the initialization period and the emission period. The scan driver 120 may apply the second gate voltage VGL to only selected scan lines during the scan period.

The data driver 130 samples and latches the data signal RGB, which is a digital signal provided from the timing controller 140, in response to the data timing control signal DDC provided from the timing controller 140, and converts the sampled and latched data signal into data of a parallel data system. When the sampled and latched data signal is converted into the data of the parallel data system, the data driver 130 converts the data signal RGB into a gamma reference voltage and converts the gamma reference voltage into an analog data signal. The data driver 130 applies the data signals D1 through Dm to the pixels PX included in the display unit 110 through the data lines DL1 through DLm, respectively. The pixels PX receive the data signals D1 through Dm in response to the scan signals S1 through Sn.

The control driver 160 drives the first and second power lines PL1 and PL2 and the control line CL, in response to the second gate timing control signal GDC2 provided from the timing controller 140, by using voltages having different levels provided from the voltage generator 150. For example, the first and second power lines PL1 and PL2 and the control line CL may be driven by using the first and second driving voltages ELVDD and ELVSS and the first and second gate voltages VGH and VGL provided from the voltage generator 150. The control driver 160 may receive from the voltage generator 150 a voltage having a level different from those of the first and second driving voltages ELVDD and ELVSS and the first and second gate voltages VGH and VGL.

The control driver 160 may apply the second driving voltage ELVSS to the first power line PL1 during the initialization period. The control driver 160 may apply the first driving voltage ELVDD to the first power line PL1 during the scan period. The control driver 160 may apply the first driving voltage ELVDD to the first power line PL1 during the emission period. The control driver 160 may apply the first gate voltage VGH to the second power line PL2 during the initialization period. The control driver 160 may apply the first driving voltage ELVDD to the second power line PL2 during the scan period. The control driver 160 may apply the second driving voltage ELVSS to the second power line PL2 during the emission period. However, the inventive concept is not limited thereto, and the control driver 160 may apply voltages having different levels to the first and second power lines PL1 and PL2 in response to the second gate timing control signal GDC2.

The control driver 160 may apply the second gate voltage VGL to the control line CL during the initialization period. The control driver 160 may apply the first gate voltage VGH to the control line CL during the scan period. The control driver 160 may apply the second gate voltage VGL to the control line CL during the emission period.

Figure 2:
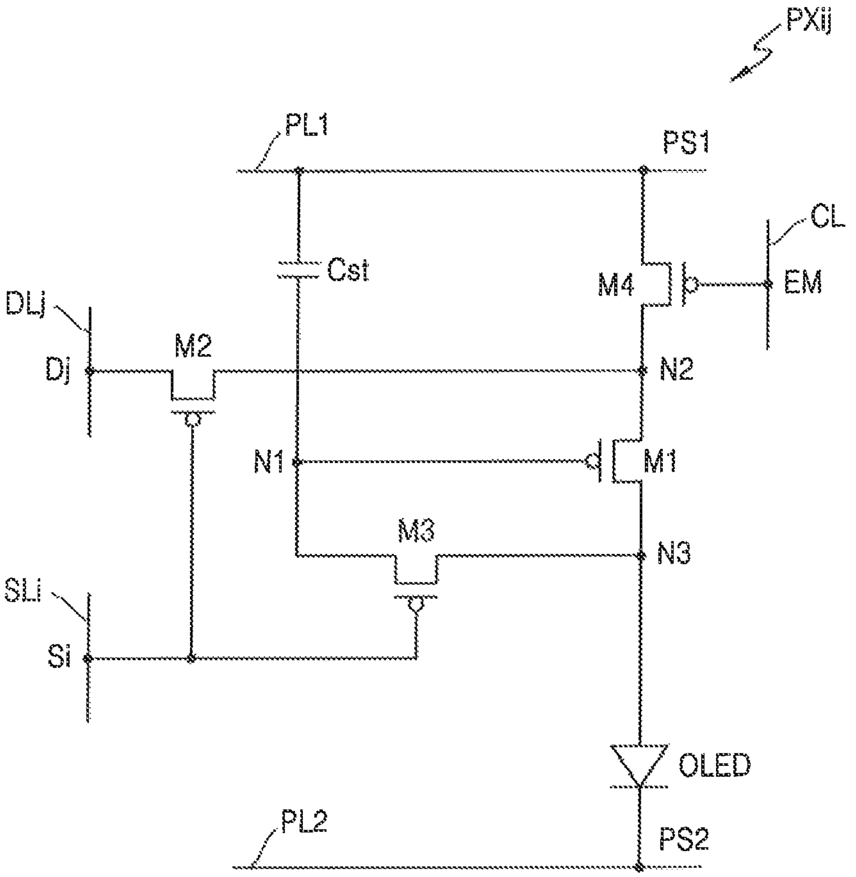
FIG. 2 is a circuit diagram of a pixel included in the organic light-emitting display apparatus of FIG. 1 according to an exemplary embodiment of the inventive concept.

FIG. 2 is a circuit diagram of a pixel included in the organic light-emitting display apparatus of FIG. 1 according to an exemplary embodiment of the inventive concept.

Referring to FIG. 2, a pixel PXij includes an organic light-emitting diode OLED, first through fourth transistors M1 through M4, and a storage capacitor Cst. The pixel PXij includes first through third nodes N1 through N3. The pixel PXij is connected to a scan line SLi among the scan lines SL1 through SLn and receives a scan signal Si through the scan line SLi from the scan driver 120. The pixel PXij is connected to a data line DLj among the data lines DL1 through DLm and receives a data signal Dj through the data line DLj from the data driver 130. The pixel PXij is connected to the control line CL and the first and second power lines PL1 and PL2, and receives the control signal EM and the first and second power voltages PS1 and PS2 from the control driver 160. Although the first through fourth transistors M1 through M4 are illustrated as p-type metal-oxide-semiconductor field-effect transistors, the inventive concept is not limited thereto and transistors having a different conductivity type may be used.

The storage capacitor Cst is connected between the first power line PL1 and the first node N1.

The first transistor M1 includes a gate terminal connected to the first node N1 and is connected between the second node N2 and the third node N3. For example, the first transistor M1 may include a source terminal connected to the second node N2 and a drain terminal connected to the third node N3. The first transistor M1 may control current flowing from the second node N2 to the third node N3 in response to a voltage of the first node N1. The current is supplied to the organic light-emitting diode OLED during the emission period and the organic light-emitting diode OLED emits light at a luminance corresponding to the amount of the current. The first transistor M1 may be referred to as a driving transistor.

The second transistor M2 includes a gate terminal connected to the scan line SLi and is connected between the data line DLj and the second node N2. For example, the second transistor M2 may include a source terminal connected to the data line DLj and a drain terminal connected to the second node N2. The second transistor M2 may apply the data signal Dj, received through the data line DLj, to the second node N2 in response to the scan signal Si received through the scan line SLi. The second transistor M2 may apply the data signal Dj to the second node N2 when the scan signal Si has the second gate voltage VGL during the scan period. The second transistor M2 may be referred to as a scan transistor.

The third transistor M3 includes a gate terminal connected to the scan line SLi and is connected between the first node N1 and the third node N3. For example, the third transistor M3 may include a source terminal connected to the third node N3 and a drain terminal connected to the first node N1. The third transistor M3 may connect the first node N1 and the third node N3 in response to the scan signal Si received through the scan line SLi. Since the first node N1 and the third node N3 are connected to a gate terminal and a drain terminal, respectively, of the first transistor M1, the first transistor M1 is diode-connected when the first node N1 and the third node N3 are connected to each other. The third transistor M3 may connect the third node N3 and the first node N1 when the scan signal Si has the second gate voltage VGL during the scan period. Since the first transistor M1 is diode-connected, a voltage obtained by subtracting a threshold voltage $|Vth|$ from a voltage Vdj of the data signal Dj (e.g., $Vdj-|Vth|$) is applied to the first node N1. The third transistor M3 may be referred to as a threshold voltage compensation transistor.

The fourth transistor M4 includes a gate terminal connected to the control line CL and is connected between the first power line PL1 and the second node N2. For example, the fourth transistor M4 may include a source terminal connected to the first power line PL1 and a drain terminal connected to the second node N2. The fourth transistor M4 may connect the first power line PL1 and the second node N2 in response to the control signal EM received through the control line CL. The fourth transistor M4 may connect the first power line PL1 and the second node N2 when the control signal EM has the second gate voltage VGL during the initialization period and the emission period. The fourth transistor M4 may be referred to as a connection transistor.

The organic light-emitting diode OLED may be connected between the third node N3 and the second power line PL2. The organic light-emitting diode OLED may include an anode connected to the third node N3 and a cathode connected to the second power line PL2.

Figure 3:
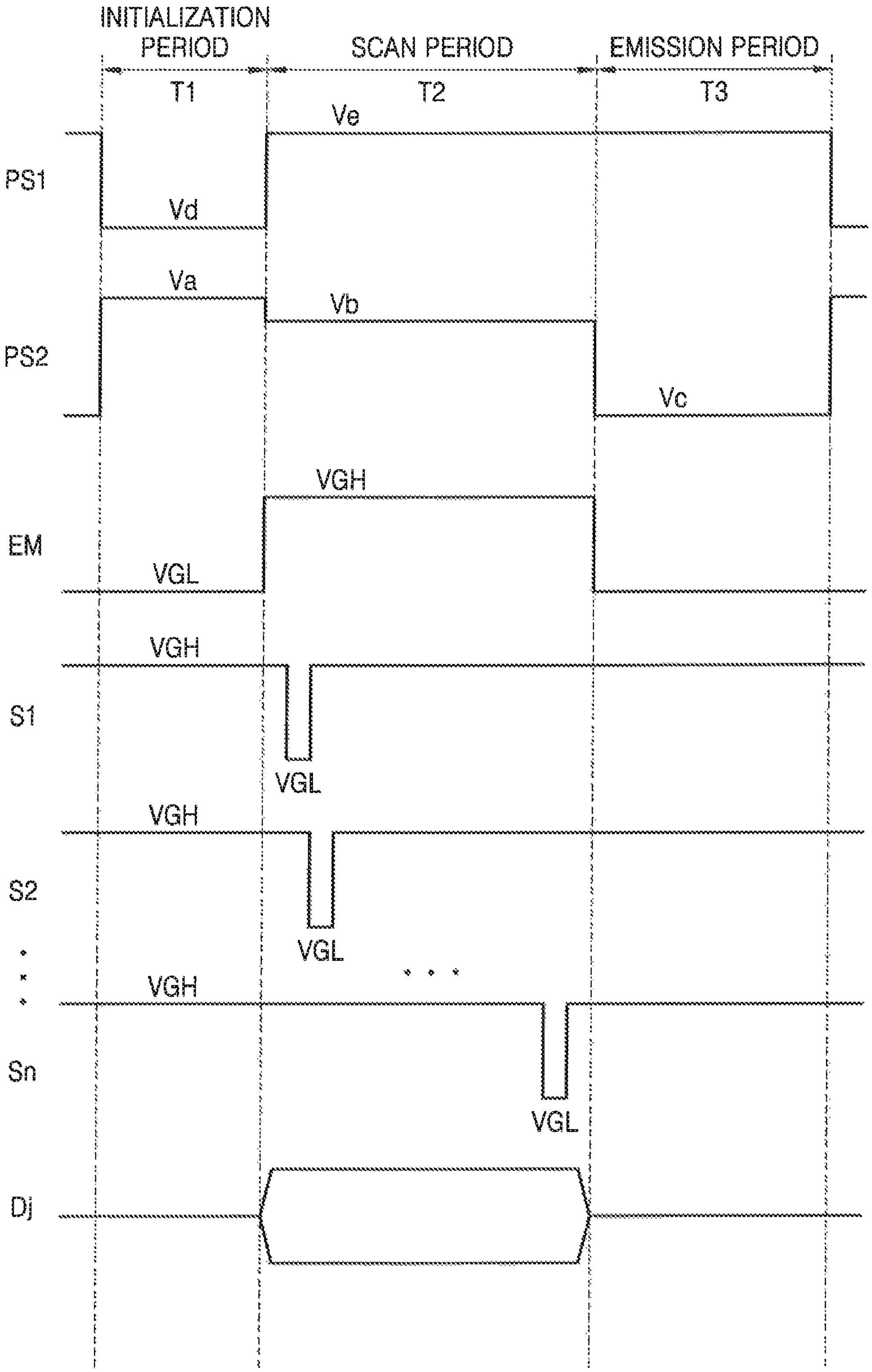
FIG. 3 is a timing diagram during one frame period for driving the pixel of FIG. 2 according to an exemplary embodiment of the inventive concept.

FIG. 3 is a timing diagram during one frame period for driving the pixel of FIG. 2 according to an exemplary embodiment of the inventive concept.

Referring to FIG. 3, the first and second power voltages PS1 and PS2, the control signal EM, the first through nth scan signals S1 through Sn, and the data signal Dj are illustrated. One frame period includes an initialization period T1, a scan period T2, and an emission period T3.

Referring to FIGS. 2 and 3, the control driver 160 of FIG. 1 applies the first and second power voltages PS1 and PS2 to the first and second power lines PL1 and PL2, respectively. Additionally, the control driver 160 outputs the control signal EM to the control line CL. The scan driver 120 outputs the first through nth scan signals S1 through Sn to the first through nth scan lines SL1 through SLn, respectively. The data driver 130 outputs the data signal Dj to the data line DLj.

The control driver 160 may output to the second power line PL2 a voltage having a first level Va during the initialization period T1, a voltage having a second level Vb, which is lower than the first level Va, during the scan period T2, and a voltage having a third level Vc, which is lower than the second level Vb, during the emission period T3. In other words, the second power voltage PS2 may have one of these three levels. Accordingly, the control driver 160 may output to the second power line PL2 a voltage having a highest level (e.g., the first level Va) during the initialization period T1 and a voltage having a lowest level (e.g., the third level Vc) during the emission period.

The control driver 160 may output to the first power line PL1 a voltage having a fourth level Vd during the initialization period T1 and a voltage having a fifth level Ve, which is higher than the fourth level Vd, during the emission period T3. Additionally, the control driver 160 may output the voltage having the fifth level Ve during the scan period T2. In other words, the first power voltage PS1 may have either a fourth level Vd or a fifth level Ve. As shown in FIG. 3, a difference between the first level Va and the third level Vc may be greater than a difference between the fifth level Ve and the fourth level Vd. Additionally, the second level Vb may be substantially the same as the fifth level Ve, and the third level Vc may be substantially the same as the fourth level Vd. For example, the voltage having the second level Vb and the voltage having the fifth level Ve may be the first driving voltage ELVDD, and the voltage having the third level Vc and the voltage having the fourth level Vd may be the second driving voltage ELVSS.

The control driver 160 may output the control signal EM as a voltage having a sixth level to the control line CL during the scan period T2, and may output the control signal EM as a voltage having a seventh level to the control line CL during the emission period T3. For example, the voltage having the sixth level may be the first gate voltage VGH and the voltage having the seventh level may be the second gate voltage VGL. The voltage having the sixth level may be substantially the same as the voltage having the first level Va. In other words, the control driver 160 may output the first gate voltage VGH to the second power line PL2 during the initialization period T1. As shown in FIG. 3, a level of the first gate voltage VGH may be higher than the second level Vb, for example, a level of the first driving voltage ELVDD. Additionally, the control driver 160 may output the control signal EM as the voltage having the seventh level (e.g., the second gate voltage VGL) to the control line CL during the initialization period T1.

According to an exemplary embodiment of the inventive concept, the control driver 160 may output the second driving voltage ELVSS to the first power line PL1, may output the first gate voltage VGH to the second power line PL2, and may output the second gate voltage VGL to the control line CL during the initialization period T1. The control driver 160 may output the first driving voltage ELVDD to the first power line PL1, may output the first driving voltage ELVDD to the second power line PL2, and may output the first gate voltage VGH to the control line CL during the scan period T2. The control driver 160 may output the first driving voltage ELVDD to the first power line PL1, may output the first driving voltage ELVDD to the second power line PL2, and may output the second gate voltage VGL to the control line CL during the emission period T3.

The scan driver 120 may output the first gate voltage VGH to the scan lines SL1 through SLn during the initialization period T1 and the emission period T3. The scan driver 120 may output the second gate voltage VGL to the scan lines SL1 through SLn during the scan period T2 according to a predetermined order, for example, sequentially. The data driver 130 may output the data signal Dj, corresponding to the image data RGB received from the timing controller 140, during the scan period T2.

An operation of the pixel PX during one frame period including the initialization period T1, the scan period T2, and the emission period T3 will be explained below. For convenience of description, it is assumed that a voltage having the first level Va is the first gate voltage VGH, a voltage having the second level Vb and a voltage having the fifth level Ve are the first driving voltage ELVDD, and a voltage having the third level Vc and a voltage having the fourth level Vd are the second driving voltage ELVSS. Additionally, it is assumed that, for example, the first driving voltage ELVDD is about 4.6 V, the second driving voltage ELVSS is about −4 V, the first gate voltage VGH is about 7 V, and the second gate voltage VGL is about −8 V.

During the emission period T3, the first driving voltage ELVDD is applied to the first power line PL1 and the second driving voltage ELVSS is applied to the second power line PL2. In this case, it is assumed that a voltage of the first node N1 (e.g., a voltage of the gate terminal of the first transistor M1 (hereinafter referred to as the driving transistor M1)) ranges from about 1 V to about 4 V according to a data voltage of a period frame. When the voltage of the first node N1 is about 1 V, the organic light-emitting diode OLED emits light at a preset maximum luminance, and when a voltage of the first node N1 is about 4 V, the organic light-emitting diode OLED does not emit light. It is assumed that a voltage of the third node N3 (e.g., a voltage of the anode of the organic light-emitting diode OLED) is a voltage of ELVSS+Voled (e.g., −4 V+Voled), which is obtained by adding the second driving voltage ELVSS to the voltage Voled of the organic light-emitting diode OLED when it emits light. It is assumed that when the organic light-emitting diode OLED does not emit light, the voltage of the third node N3 is about −4.6 V.

When the initialization period T1 starts, the second driving voltage ELVSS is applied to the first power line PL1 and the first gate voltage VGH is applied to the second power line PL2. Since a reverse voltage is applied to the organic light-emitting diode OLED, light emission is stopped. Since the voltage of the first power line PL1 changes by about −8.6 V and the storage capacitor Cst maintains a voltage between the first power line PL1 and the first node N1, the voltage of the first node N1 drops to about −7.6 V to −4.6 V. Since the voltage of the second power line PL2 rises by about 11 V and the organic light-emitting diode OLED functions as a capacitor that maintains a voltage at both ends, the voltage of the third node N3 rises to about (7 V+Voled) to 6.4 V. Since the voltage of the third node N3 is greater than the voltage of the second node N2, the driving transistor M1 is controlled by the voltage between the third node N3 and the first node N1. Since the voltage of the first node N1 is significantly less than the voltage of the third node N3, the driving transistor M1 is fully turned on. Accordingly, the driving transistor M1 is initialized irrespective of how much current is output during the emission period T3 of a previous frame. Hysteresis characteristics of the driving transistor M1 may be removed or reduced.

Since the driving transistor M1 is turned on, the voltage of the third node N3 drops to about −4 V to (−4.6 V+|Vth|) according to the voltage of the first node N1. When the voltage of the first node N1 is small enough, for example, −7.6 V, the voltage applied to the first power line PL1 through the fourth transistor M4 (e.g., the second driving voltage ELVSS) is applied to the third node N3. When the voltage of the first node N1 is about −4.6 V, the voltage of the third node N3 drops until the driving transistor M1 is turned off, (e.g., until the voltage between the third node N3 and the first node N1 is less than the threshold voltage |Vth| of the driving transistor M1). In other words, the voltage of the third node N3 drops to about −4.6 V+|Vth|. Since the voltage of the third node N3 is less than the voltage of the second power line PL2 (e.g., the first gate voltage VGH), the organic light-emitting diode OLED completely stops light emission. In other words, the anode of the organic light-emitting diode OLED is initialized. Accordingly, a case where the organic light-emitting diode OLED slightly emits light when the data signal Dj corresponding to a full black image is received may be prevented.

When the scan period T2 starts, the first driving voltage ELVDD is applied to the first power line PL1 and the second power line PL2. Since there is no potential difference between the first power line PL1 and the second power line PL2, current does not flow through the organic light-emitting diode OLED and the organic light-emitting diode OLED maintains a non-emission state. The second and third transistors M2 and M3 are turned on and the fourth transistor M4 is turned off.

Since the voltage of the first power line PL1 rises by about 8.6 V and the storage capacitor Cst maintains a voltage between the first power line PL1 and the first node N1, the voltage of the first node N1 rises to about 1 V to 4 V. Since the voltage of the second power line PL2 changes by about −2.4 V and the organic light-emitting diode OLED functions as a capacitor that maintains a voltage at both ends, the voltage of the third node N3 drops to about (−7 V+|Vth|) to −6.4 V. However, as the third transistor M3 is turned on, the first node N1 and the third node N3 are connected to each other to have substantially the same potential. A charge stored in the storage capacitor Cst and a charge stored in the organic light-emitting diode OLED are shared, and thus, voltages of the first node N1 and the third node N3 change to about −2.7 V to −1.2 V. However, these values are only examples and may vary according to a ratio of a capacitance of the storage capacitor Cst to a capacitance of the organic light-emitting diode OLED.

The third transistor M3 is turned on, and the driving transistor M1 is diode-connected. The data signal Dj is applied to the second node N2 through the second transistor M2, and due to the driving transistor M1 that is diode-connected, the voltage of the first node N1 becomes a voltage obtained by subtracting the threshold voltage |Vth| of the driving transistor M1 from a voltage Vdata of the data signal Dj (e.g., Vdata−|Vth|). The voltage Vdata−|Vth| ranges from about 1 V to 4 V and is referred to as a compensation voltage. As described below in detail, the driving transistor M1 outputs, to the organic light-emitting diode OLED, a current having a magnitude corresponding to a square of a value ELVDD−Vdata (e.g., $(ELVDD-Vdata)^2$). The value ELVDD−Vdata is obtained by subtracting the threshold voltage |Vth| from a source-gate voltage ELVDD−Vdata+|Vth| during the emission period T3. In other words, current that is determined irrespective of the threshold voltage |Vth| of the driving transistor M1 may be output. Accordingly, a reduction in image quality due to non-uniformity of the threshold voltage |Vth| of the driving transistor M1 may be prevented.

Voltages of the first node N1 and the third node N3 after charge sharing should be less than the compensation voltage Vdata−|Vth|. Otherwise, the voltage Vdata of the data signal Dj may not pass through the driving transistor M1 that is diode-connected, and a voltage irrespective of the voltage Vdata of the data signal Dj may be stored in the storage capacitor Cst. According to an exemplary embodiment of the inventive concept, since a level of the voltage applied to the second power line PL2 during the scan period T2 is lower than a level of the voltage applied to the second power line PL2 during the initialization period T1, the voltage of the third node N3 at a start point of the initialization period T1 may be less than the voltage of the third node N3 at an end point of the scan period T2. Accordingly, a case where voltages of the first node N1 and the third node N3, after charge sharing, are greater than the compensation voltage Vdata−|Vth| may be prevented.

When the emission period T3 starts, the first driving voltage ELVDD is continuously applied to the first power line PL1 and the second driving voltage ELVSS is applied to the second power line PL2. Since the voltage of the first power line PL1 does not change, the voltage of the first node N1 is continuously maintained at the compensation voltage Vdata−|Vth|. In other words, the voltage of the first node N1 is maintained in a range from about 1 V to 4 V, similar to as described above. Since the voltage of the second power line PL2 changes by about −8.6 V and the organic light-emitting diode OLED functions as a capacitor that maintains a voltage at both ends, the voltage of the third node N3 drops to about −7.6 V to −4.6 V. When the voltage of the first node N1 is about 1 V, the voltage of the third node N3 drops to about −7.6 V, and when the voltage of the first node N1 is about 4 V, the voltage of the third node N3 drops to about −4.6 V. Since the organic light-emitting diode OLED should not emit light when the voltage of the first node N1 is about 4 V, as described above, and a voltage of the anode of the organic light-emitting diode OLED is less than a voltage of the cathode, the organic light-emitting diode OLED does not emit light. Accordingly, a case where the organic light-emitting diode OLED slightly emits light when the data signal Dj corresponding to a full black image is received may be prevented.

When the voltage of the first node N1 is less than about 4 V, the driving transistor M1 outputs current having a magnitude proportional to $(ELVDD-Vdata)^2$ to the organic light-emitting diode OLED, as described above. As the organic light-emitting diode OLED starts light emission, the voltage of the third node N3 becomes a voltage ELVSS+Voled, e.g., −4 V+Voled, which is obtained by adding the voltage Voled of the organic light-emitting diode OLED to the second driving voltage ELVSS, as described above.

Accordingly, the pixel PX according to an exemplary embodiment of the inventive concept may operate for one frame period including the initialization period T1, the scan period T2, and the emission period T3. Since states of a start point and an end point of the one frame period are the same, the pixel PX may continuously operate. The pixel PX may include only 4 transistors, may remove hysteresis characteristics by initializing the driving transistor M1, may compensate for the threshold voltage Vth of the driving transistor M1, and may allow the organic light-emitting diode OLED to completely stop light emission. Accordingly, since the organic light-emitting display apparatus 100 including the pixel PX may be manufactured to have a high resolution greater than or equal to 1000 ppi, the organic light-emitting display apparatus 100 may display an image having higher quality. In particular, the organic light-emitting display apparatus 100 may be efficiently used in a display apparatus (e.g., a head-mounted display apparatus) where eyes of a user and a screen are very close to each other. In other words, the organic light-emitting display apparatus 100 may be realized as a head-mounted display apparatus.

According to exemplary embodiments of the inventive concept, as described above, a pixel includes only three switching transistors in addition to a driving transistor, and is connected to only one control line in addition to a scan line and a data line. Accordingly, an area of the pixel may be reduced and a resolution of an organic light-emitting display apparatus including the pixel may be increased. Additionally, the pixel may reduce negative effects of non-uniformity of a threshold voltage of the driving transistor, remove hysteresis characteristics of the driving transistor, and prevent an organic light-emitting diode from slightly emitting light when displaying a black image. Accordingly, the organic light-emitting display apparatus according to exemplary embodiments of the inventive concept may display an image having high quality and a high resolution.

While the inventive concept has been described with reference to exemplary embodiments thereof, it will be understood by those of ordinary skill in the art that various changes in form and details may be made thereto without departing from the spirit and scope of the inventive concept as defined by the following claims.

What is claimed is:

1. An organic light-emitting display apparatus configured to be driven during a frame period comprising an initialization period, a scan period, and an emission period, the organic light-emitting display apparatus comprising:

a pixel connected to a scan line configured to apply a scan signal, a data line configured to apply a data signal, a control line configured to apply a control signal, and first and second power lines, the pixel comprising:

first through third nodes;

a storage capacitor connected between the first power line and the first node;

a first transistor configured to control current flowing from the second node to the third node in response to a voltage of the first node;

a second transistor configured to apply the data signal to the second node in response to the scan signal;

a third transistor configured to connect the first node to the third node in response to the scan signal;

a fourth transistor configured to connect the first power line to the second node in response to the control signal;

an organic light-emitting diode connected between the third node and the second power line; and a control driver configured to drive the first and second power lines and the control line, wherein the control applies a first level of voltage to the second power line during the initialization period, a second level of voltage to the second power line during the scan period, and a third level voltage to the second power line during the emission period, and wherein the first level is higher than the second level, and the second level is higher than the third level.

2. The organic light-emitting display apparatus of claim 1, wherein the control driver applies a forth level of voltage to the first power line during the initialization period, and a fifth level of voltage to the first power line during the emission period, wherein the fifth level is higher than forth level.

3. The organic light-emitting display apparatus of claim 2, wherein the control driver applies the fifth level of voltage to the first power line during the scan period.

4. The organic light-emitting display apparatus of claim 2, wherein a difference between the first level and the third level is greater than a difference between the fifth level and the forth level.

5. The organic light-emitting display apparatus of claim 2, wherein the second level is substantially the same as the fifth level, and the third level is substantially the same as the fourth level.

6. The organic light-emitting display apparatus of claim 2, wherein:

the control driver applies a sixth level of voltage, as the control signal, to the fourth transistor during the scan period to turn off the fourth transistor, and the control driver applies a seventh level of voltage, as the control signal, to the fourth transistor during the emission period to turn on the fourth transistor.

7. The organic light-emitting display apparatus of claim 6, wherein the sixth level is substantially the same as the first level.

8. The organic light-emitting display apparatus of claim 6, wherein the control driver applies the seventy level of voltage, as the control signal, to the fourth transistor during the initialization period to turn on the fourth transistor.

9. An organic light-emitting display apparatus configured to be driven during a frame period comprising an initialization period, a scan period, and an emission period, the organic light-emitting display apparatus comprising a pixel comprising:

a storage capacitor connected between a first power line and a first node;

a first transistor comprising a gate terminal connected to the first node, wherein the first transistor is connected between second and third nodes;

a second transistor comprising a gate terminal connected to a scan line, wherein the second transistor is connected between a data line and the second node;

a third transistor comprising a gate terminal connected to the scan line, wherein the third transistor is connected between the first and third nodes;

a fourth transistor comprising a gate terminal connected to a control line, wherein the fourth transistor is connected between the first power line and the second node;

an organic light-emitting diode connected between the third node and a second power line; and a control driver configured to drive the first and second power lines and the control line, wherein:

during the initialization period, the control driver applies a first level of voltage to the second power line and a second level of voltage to the first power line, during the emission period, the control driver applies a third level of voltage to the first power line and a fourth level of voltage to the second power line, and a difference between the first level and the second level is greater than a difference between the third level and the fourth level.

10. The organic light-emitting display apparatus of claim 9, wherein:

during the emission period, the control driver applies a first driving voltage to the first power line, and a second driving voltage, which is less than the first driving voltage, to the second power line, and during the initialization period, the control driver applies the second driving voltage to the first power line, and a gate-off voltage, which is greater than the first driving voltage, to the second power line.

11. The organic light-emitting display apparatus of claim 9, wherein during the scan period, the control driver applies the first driving voltage to the first and second power lines.

12. The organic light-emitting display apparatus of claim 9, wherein the control driver applies a gate-off voltage to the control line during the scan period, and a gate-on voltage to the control line during the initialization period and the emission period.

13. An organic light-emitting display apparatus configured to be driven during a frame period comprising an initialization period, a scan period, and an emission period, the organic light-emitting display apparatus comprising:

a display unit comprising pixels;

a voltage generator configured to generate a first driving voltage, a second driving voltage that is less than the first driving voltage, a first gate voltage that is greater than the first driving voltage, and a second gate voltage that is less than the first gate voltage; and a control driver configured to drive first and second power lines and a control line connected to the pixels by using the first and second driving voltages and the first and second gate voltages, wherein the control driver applies the first gate voltage to the second power line during the initialization period.

14. The organic light-emitting display apparatus of claim 13, wherein each of the pixels comprises:

a storage capacitor connected between the first power tine and a first node;

a first transistor comprising a gate terminal connected to the first node, wherein the first transistor is connected between second and third nodes;

a second transistor comprising a gate terminal connected to a scan line, wherein the second transistor is connected between a data line and the second node;

a third transistor comprising a gate terminal connected to the scan line, wherein the third transistor is connected between the first and third nodes;

a fourth transistor comprising a gate terminal connected to the control line, wherein the fourth transistor is connected between the first power line and the second node; and an organic light-emitting diode connected between the third node and the second power line.

15. The organic light-emitting display apparatus of claim 13, wherein the control driver applies the second driving voltage to the first power line during the initialization period.

16. The organic light-emitting display apparatus of claim 13, wherein the control driver applies the first driving voltage to the first power line and the second power line during the scan period.

17. The organic light-emitting display apparatus of claim 13, wherein the control driver applies the first driving voltage to the first power line and applies the second driving voltage to the second power line during the emission period.

18. The organic light-emitting display apparatus of claim 13, wherein the control driver applies the second gate voltage to the control line during the initialization period and the emission period, and applies the first gate voltage to the control line during the scan period.

19. The organic light-emitting display apparatus of claim 13, wherein the pixels sequentially receive data signals during the scan period, substantially simultaneously emit light when the emission period starts, and substantially simultaneously stop light emission when the initialization period starts.

* * * * *